3,056,669
COMPOSITION AND METHOD FOR MODIFYING PLANT GROWTH
Clarence L. Moyle and Dorsey R. Mussell, Clare, Mich., assignors to The Dow Chemical Company, Midland, Mich., a corporation of Delaware
No Drawing. Filed June 3, 1957, Ser. No. 662,969
18 Claims. (Cl. 71—2.6)

This invention relates to plant growth control materials and is particularly concerned with the modification of the growth characteristics of plants by the application of chloro-substituted and nitro-substituted hippuric acids and their salts to plant surfaces.

The modification of plant growth by chemicals has been extensively investigated with respect to a number of phenomena. Among the problems in this field are the inhibition of prevention of leaf or root growth, stimulation of root development, prevention of fruit drop, and parthenocarpic fruit development. Considerable research has been carried out on methods and means for breaking dormancy. A particular phase of plant growth control which has long constituted a major problem to the horticulturist is that of controlling the foliation, budding and blooming of fruit trees and ornamentals so as to avoid the injury frequently resulting from late spring frosts and unseasonable periods of cold and inclement weather. The occurrence of killing frosts and prolonged cold spells at the time of year immediately prior to and following foliation and during bud formation has frequently resulted in the substantial destruction of a grower's crop such as citrus fruits, apples, peaches, plums, apricots and other deciduous varieties. Preventive methods heretofore employed have been, for the most part, mechanical. Orchards in bloom, where possible, have been covered to protect the blossoms of flower, fruit and leaf buds. Other means have comprised the use of smudge pots or other warming devices, or the forced circulation of warm air in and around the trees. Such methods are not only expensive but relatively inefficient since they do not offer protection in the event that the temperature drops below freezing for any extended period of time. The need exists for some relatively inexpensive method whereby the breaking of dormancy and development of flower and leaf buds may be delayed to avoid frost and freezing injury.

Further, many fruit trees produce an excess of blossoms with the result that more fruit is set than the tree can support and nourish to marketable size and maturity. Hand thinning, as practiced in the past, is laborious and costly. Thus, there is need for an economical method for preventing excessive blossoming and fruit set in order to produce a higher yield of marketable fruit even where frost damage is not a problem.

It is among the objects of this invention to provide a method and improved composition for modifying the growth characteristics of plants. An additional object is to provide a method and composition for the control of the blossoming of plants. Another object is to provide means for the controlled inhibition of root growth of many types of vegetation. Yet another object of this invention is the provision of a method and compositions which will increase the harvest of various crop plants and benefit both crop and ornamental trees.

According to the present invention, it has been discovered that the growth characteristics of plants may be modified by contacting plants or plant parts with a substituted hippuric acid compound of the formula

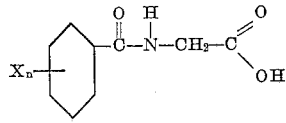

wherein X represents a chloro or nitro radical and $n$ is an integer from 1 to 2, inclusive, or an alkali metal, ammonium, lower alkyl amine or alkanol amine salt thereof. It is among the advantages of the invention that the foliation and blooming of plants and particularly of fruit trees and ornamentals is controlled and the dormant period extended by the application to the dormant plant or tree of compositions comprising a monochloro-, dichloro-, mononitro- or dinitro-hippuric acid or an alkali metal, lower alkylamine, alkanolamine or ammonium salt thereof. In a further embodiment of the invention, the growth of plant parts, such as roots, is inhibited by contacting said parts with one of the substituted hippuric acid compounds.

The substituted hippuric acids as defined above are crystalline solids, somewhat soluble in polar solvents such as lower alkanols and lower aliphatic ketones and of low solubility in water and liquid hydrocarbon solvents. The salts of said acids such as the potassium, sodium, ammonium, dimethyl amine, triethyl amine, isopropyl amine, butyl amine, ethanol amine, triethanol amine and diisopropanol amine salts are somewhat soluble in water and lower alkanols and substantially insoluble in hydrocarbon solvents.

In carrying out the invention, the required amount of the substituted hippuric acid compound is applied in any suitable fashion, provided the plant or plant part to be controlled is contacted with an effective amount of the active compound. The term "substituted hippuric acid compound," as employed herein, refers both to the free acids and the salts thereof as defined above. In one mode of operation, the substituted hippuric acid compound is incorporated into a suitable spray or dust composition and applied to the plant or tree by conventional techniques. In another method the active ingredient is distributed so as to contact germinant seeds and emerging seedlings of the vegetation to be controlled. In the latter operation, the method is conveniently carried out by impregnating the soil with a growth modifying amount of one of the substituted hippuric acid compounds.

The method of the present invention for the inhibition of foliation and budding may be carried out by distributing the substituted hippuric acid compounds on the plants or trees as liquid or dust compositions containing the active ingredient. The method of the present invention for the inhibition of root growth may be carried out by distributing the compounds in or on the soil in close proximity to germinant seed and root surfaces of emerging seedlings or established vegetation. The latter operation is frequently facilitated by the application of liquid or dust compositions containing the active ingredient. In any case, it is generally desirable to facilitate the distribution of the active hippuric acid compound by incorporating the active ingredient in a liquid or finely divided solid carrier. In such usage, the hippuric acid compounds may be modified with one or a plurality of additaments or herbicide adjuvants, including water or other liquid carriers, surface-active dispersing agents and finely divided inert solids. Depending upon the concentration of the toxicant, such augmented compositions are adapted to be distributed directly or employed as concentrates and subsequently diluted with additional inert carrier to produce the ultimate treating compositions.

In the preparation of liquid compositions, the substituted hippuric acid compounds may be dissolved in a suitable organic solvent such as alcohol, acetone or the like with or without the addition of a surface-active dispersing agent. Alternatively, the active compounds or a solution thereof in an organic solvent may be dispersed in water to prepare aqueous solution, suspension or emulsion compositions. In the preparation of such aqueous compositions, it is preferred to employ a suitable surface-active dispersing agent to facilitate the dispersion operation and to provide desirable wetting, spreading and penetrating properties in the finished compositions. Where the substituted hippuric acid compound is to be applied to dormant trees, the active material may conveniently be incorporated in the usual dormant sprays, as for example, in oil emulsions or other compositions frequently employed in a dormant spray schedule.

In the preparation of dusts, the active substituted hippuric acid compound may be mixed with a finely divided inert carrier and mechanically milled to provide a uniform intimate admixture of the active ingredient with the inert solid carrier. Alternatively, the active compound may be dissolved in a suitable volatile organic solvent and the resulting solution be mixed with a finely divided inert carrier to produce the desired dust composition. In such operations, the dust compositions may be prepared as dilute dusts for direct application to the soil or to vegetation or as concentrates adapted for subsequent extention with further amounts of finely divided carrier prior to application. In one convenient mode of operation, a suitable surface-active dispersing agent is incorporated with the substituted hippuric acid compound and finely divided inert carrier to produce wettable powder compositions adapted to be dispersed in water for application to plants or soil.

Suitable finely divided inert solids for use in the above compositions include inorganic carriers such as talc, clay, chalk, gypsum, diatomaceous earth, pyrophyllite, and volcanic ash as well as organic carriers such as woodflour, walnut shell flour and finely ground peanut shells. Among the inorganic carriers, the clay minerals such as kaolinite, bentonite and attapulgite have proved particularly valuable from the standpoints of economy and ease of preparation. Further, certain of the clays such as bentonite and fuller's earth are particularly desirable in wettable powder compositions since such clays aid in dispensing the composition in water.

The choice of surface-active dispersing agent and the amount thereof employed are dictated by the nature of the composition type and by the ability of the agent to facilitate the dispersion of the toxicant compound in an aqueous carrier or to provide desirable wetting and penetrating properties in the final aqueous composition. The surface-active dispersing agents are generally employed in the amount of from 1 to 20 percent by weight of the combined weights of the agent and the substituted hippuric acid compound in the composition. Suitable surface-active dispersing agents include the condensation products of alkylene oxides with phenols and organic acids, alkyl aryl sulfonates, polyoxyethylene derivatives of sorbitan esters, complex ether alcohols, mahogany soaps and the like.

The exact concentration of the compounds to be employed in compositions may vary depending on whether the composition is designed as a concentrate for subsequent dilution or is prepared for direct application to plants. The concentration of toxicant in organic solvent concentrate compositions is generally from about 10 to 85 percent by weight. With aqueous compositions, the toxicant is generally employed at concentrations of from about 0.01 to about 1 percent where the composition is applied to plants and concentrations of as little as 0.0001 percent by weight conveniently may be employed in irrigation treatments of soil. In aqueous concentrates, the active ingredient may be employed in amounts of from about 5 to 50 percent by weight. In dusts, the concentration of toxicant may be from 1 to 50 percent by weight, although concentrations as low as 0.1 percent by weight are sometimes employed. In concentrate compositions comprising te substituted hippuric acid compound in admixture with a surface active dispersing agent, the toxicant oftentimes may be present in a concentration of from 5 to 98 percent.

The distribution of an effective amount of the substituted hippuric acid so as to contact the plant or plant part is essential for the practice of the present invention. In general, good results in dormancy control are obtained when one of the compounds is distributed so as to wet the plants thoroughly with an aqueous composition containing a growth modifying amount of the substituted hippuric acid compound. The exact concentration of active ingredient employed may vary between about 100 parts and 5,000 parts per million parts of ultimate spray composition depending upon the variety of plant, the time of application, the length of time for which it is desired to extend the dormant period and the tolerance of the plant for the particular compound concerned. Good results have been obtained with spray compositions containing from about 1,200 to about 4,000 parts of the substituted acid compounds per million parts of composition.

The application of the compositions as described above to the plant surfaces prior to termination of dormancy will extend the dormant period for from one week to a month or more, depending upon the time of application, the plant variety concerned, and the concentration of acid compound employed. The premature swelling and opening of the leaf and flower buds is thereby avoided and, accordingly, the danger of injury from late frost or freeze is minimized. Similarly on species which leaf out some time before flowering, the compositions may be applied to the foliated plant to delay the opening of the flower buds or to reduce the total amount of flowering and fruit set. After the influence of the growth regulating substance has passed, a desirable number of flower buds open normally and set and produce fruit. An added advantage not infrequently accruing to the treatment is the effect upon the formation of the bud abscission layer whereby the tendency of flower and leaf buds to abscise is materially reduced.

The suggested treatment is of particular importance with respect to large scale peach, apple, cherry, apricot, and plum production in those portions of the temperate zone where late spring frosts are the rule rather than the exception. The treatment is relatively inexpensive and where combined with the customary dormant spray scedule does not materially increase the over-all cost of the annual spray program.

While the sprays described above are usually applied to the trees during the dormant or resting period they are not essentially "dormant sprays" as the expression is generally understood. The usual "dormant application or spray" frequently is applied to the tree immediately prior to blossoming or during the pre-pink stage for the control of insects such as aphis and scale. The present invention is concerned with the application of the chloro and nitro substituted hippuric acids and particularly of sprays comprising such compounds to the growing plant at a time sufficiently ahead of the normal blossoming or foliation time to accomplish the extension of the dormant or rest period. The "normal blossoming time" varies with locality but in any instance is that period over which unsprayed trees usually blossom.

The application of the compositions as described above to plant surfaces for the inhibition of root growth can be accomplished by impregnating the soil with such compositions or otherwise distributing the compositions in and on the soil adjacent the root system. Application in this manner, will materially reduce the root growth of plants depending upon the time of application, the plant variety concerned and the concentration of the compound employed. Good results have been obtained with application of spray compositions containing from about 0.01 to about 1 percent by weight of the substituted acid compounds per million parts of growth media treated. Also, when application of the acid compounds is practiced by introduction into irrigation water, good results have been obtained when employing at least about 0.0001 percent by weight of the acid per million parts by weight of irrigation water. In the suppression of broad leaf weed seedlings, good controls have been obtained when the toxicant compounds are distributed in the amount of at least about 50 pounds per acre.

The substituted hippuric acids of the invention may conveniently be prepared by reacting a substituted benzoyl chloride of the formula

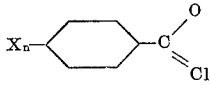

wherein X has the aforementioned significance, with an alkali metal salt of glycine in the presence of a hydrogen chloride acceptor such as a tertiary amine or an alkali metal hydroxide. In one method of preparation, the benzoyl chloride is dissolved in an inert, water-immiscible organic solvent and the resulting solution mixed with an aqueous solution of alkali metal salt of glycine. The resulting mixture is agitated vigorously for a period of time at temperatures of from about 20° to 60° C. to complete the reaction with the formation of the alkali metal salt of the desired substituted hippuric acid product. The latter is water-soluble and is extracted into the aqueous phase as formed. On completion of the reaction, the aqueous solution of the product is separated by decantation and acidified with a mineral acid such as hydrochloric acid to precipitate the substituted hippuric acid product as a crystalline solid. The latter may be reacted in conventional fashion with an ammonium or alkali metal hydroxide or with an amine to produce the ammonium, alkali metal and amine salts, respectively.

Representative substituted hippuric acids employed in the invention are characterized as follows:

| Compound | Melting Point, °C. | Molecular weight |
| --- | --- | --- |
| 3,5-Dinitrohippuric Acid | 177–178 | 269 |
| 3,4-Dichlorohippuric Acid | 132–134.5 | 248 |
| 2,4-Dichlorohippuric Acid | 166–168 | 248 |
| p-Chlorohippuric Acid | 143 | 214 |
| p-Nitrohippuric Acid | 133.5 | 224 |
| m-Nitrohippuric Acid | 165–167 | 224 |

The following examples are illustrative with respect to the particular compounds and concentrations thereof employed and are not to be construed as limiting the invention.

Example 1

4 parts by weight of the sodium salt of 3,5-dinitro hippuric acid and 1,000 parts by weight of water were mixed together until the 3,5-dinitrohippuric acid salt was entirely dispersed. This composition, containing 4,000 parts of sodium 3,5-dinitro-hippurate per million parts of ultimate mixture was applied to hibiscus plants which had not yet blossomed although foliage had developed. The application was made by spraying so as to wet thoroughly the foliage and stems of the plants. Other hibiscus plants in a similar stage of growth were sprayed with water alone to serve as checks. Observations were also carried out on unsprayed check plants. Sixty days after application, the flower buds on the unsprayed plants and on those treated with water alone began to develop. On the plants treated with the composition comprising the 3,5-dinitrohippuric acid salt, flower buds did not begin to develop until four months (120 days) after treatment, at which time the check plants had numerous blossoms.

Example 2

Following the procedure of Example 1, compositions comprising 4,000 parts per million of the sodium salts of 3,4-dichlorohippuric acid, 2,4-dichlorohippuric acid, p-chlorohippuric acid, p-nitrohippuric acid and m-nitrohippuric acid were applied to foliated hibiscus not yet in blossom. The results observed were similar to those set forth in Example 1 and are tabulated below:

| Compound as Sodium Salt | p.p.m. of compound | Number of blossoms 90 days after treatment |
| --- | --- | --- |
| 3,4-dichlorohippuric acid | 4,000 | 3 |
| 2,4-dichlorohippuric acid | 4,000 | 0 |
| p-chlorohippuric acid | 4,000 | 0 |
| p-nitrohippuric acid | 4,000 | 2 |
| m-nitrohippuric acid | 4,000 | 3 |
| checks | 0 | 6 |

Example 3

5 parts by weight of p-chlorohippuric acid and 3 parts of dimeric alkylated aryl polyether alcohol (Triton X-155) are dissolved in 92 parts of acetone to prepare a liquid concentrate composition. This composition is adapted to be dispersed in water to prepare aqueous spray compositions.

Example 4

98 parts by weight of potassium p-chlorohippurate and 2 parts of an alkylaryl sulfonate (Nacconal NR) are mechanically mixed and the mixture hammermilled to produce a water soluble concentrate having desirable wetting and penetrating properties. Similar compositions are prepared employing potassium 3,4-dinitrohippurate, ammonium 2,4-dichlorohippurate, the trimethyl amine salt of 3,4-dichlorohippuric acid, the butylamine salt of p-nitrohippuric acid, the diisopropyl amine salt of m-nitro hippuric acid or the diethanolmonoisopropanol amine salt of 2,4-dinitrohippuric acid instead of the potassium p-chlorohippurate.

Example 5

25 parts by weight of o-chlorohippuric acid, 72 parts of clay (Diluex), 1 part of the sodium salt of polymerized benzoid alkyl sulfonic acid (Daxad No. 27) and 2 parts of a sorbitan monolaurate polyoxyethylene derivative (Tween 20) are mechanically mixed and milled together to prepare a wettable powder concentrate.

The compositions of Examples 3, 4 and 5 are adapted to be dispersed in water to produce aqueous compositions having desirable wetting and penetrating properties. The latter compositions are adapted to be employed as soil drenches or to treat plants and plant parts and to distribute the substituted hippuric acid compounds thereon in effective concentrations.

Example 6

A wettable powder concentrate similar to that of Example 5 containing 3,4-dichlorohippuric acid as the active plant growth control agent was dispersed in water to prepare a dilute suspension. The latter was applied as a soil drench to an area of soil previously planted with radish seed. The concentration of the dilute suspension was adjusted so as to apply the 3,4-dichlorohippuric acid at the rate of 50 pounds per acre dispersed in about 0.4 acre-inch of aqueous composition per acre. Thereafter the soil was maintained under good growing conditions. Similarly seeded areas were maintained untreated to serve as checks. About 1 week after the application the areas were examined for the growth of seedlings. In the untreated check area radish seedlings had emerged and were making vigorous growth while in the area treated with the dichlorohippuric acid composition no growth of seedlings had taken place.

Other modes of applying the principle of the invention may be employed instead of those explained, change being made as regards the method herein disclosed, provided the steps stated by any of the following claims or the equivalent of such stated steps are employed.

We therefore, particularly point out and distinctly claim as our invention:

1. A method for modifying the growth characteristics of plants growing in soil which comprises exposing plants and plant parts to a growth modifying amount of a compound selected from the group consisting of (A) substituted hippuric acid compound of the formula

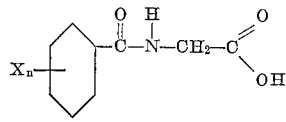

wherein X is selected from the group consisting of chlorine and nitro radicals, and $n$ is an integer from 1 to 2, inclusive, and (B) the ammonium, alkali metal, lower alkylamine and lower alkanolamine salts thereof.

2. An agronomic practice which comprises impregnating soil with a growth modifying amount of a compound selected from the group consisting of (A) substituted hippuric acid compounds of the formula

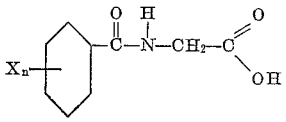

wherein X is selected from the group consisting of chlorine and nitro radicals, and $n$ is an integer from 1 to 2, inclusive, and (B) the ammonium, alkali metal, lower alkylamine and lower alkanolamine salts thereof.

3. A method for modifying the growth characteristics of plants growing in soil which comprises contacting plant parts with a composition comprising a herbicide adjuvant in intimate mixture with a growth modifying amount of a compound selected from the group consisting of (A) substituted hippuric acid compounds of the formula

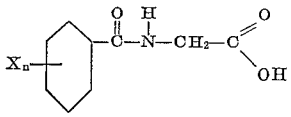

wherein X is selected from the group consisting of chlorine and nitro radicals, and $n$ is an integer from 1 to 2, inclusive, and (B) the ammonium, alkali metal, lower alkylamine and alkanolamine salts thereof.

4. In a method for extending the dormant period of trees growing in soil, the step of applying to the dormant tree a spray comprising a growth-modifying amount of a composition containing a compound selected from the group consisting of (A) substituted hippuric acid compounds having the formula

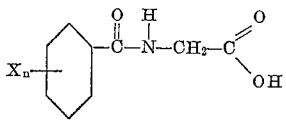

wherein X represents a member selected from the group consisting of chlorine and nitro radicals, $n$ is an integer from 1 to 2 inclusive, and (B) the ammonium, alkali metal, lower alkylamine and alkanolamine salts thereof.

5. A composition comprising a substituted hippuric acid compound as an active ingredient in intimate admixture with a herbicide adjuvant selected from the group consisting of (I) inert finely divided solids and (II) emulsifying and dispersing agents, the amount of such adjuvants employed in the compositions being from 50 to 99 percent by weight for (I) and from 1 to 20 percent by weight for (II), said compound being selected from the group consisting of (A) substituted hippuric acid compounds having the formula

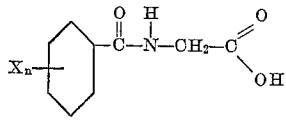

wherein X represents a member selected from the group consisting of chlorine and nitro radicals and $n$ is an integer from 1 to 2, inclusive, and (B) the ammonium, alkali metal, lower alkylamine and alkanolamine salts thereof.

6. A concentrate composition comprising a substituted hippuric acid compound in intimate admixture with an inert finely divided solid, the compound being present in the amount of from 1 to 50 percent by weight of the composition, the compound being selected from the group consisting of (A) substituted hippuric acid compounds having the formula

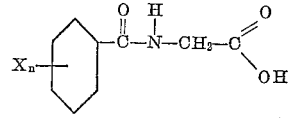

wherein X represents a member selected from the group consisting of chlorine and nitro radicals, and $n$ is an integer from 1 to 2, inclusive, and (B) the ammonium, alkali metal, lower alkylamine and alkanolamine salts thereof.

7. A concentrate composition comprising a substituted hippuric acid compound in intimate admixture with a surface active dispersing agent, the compound being present in the amount of from 80 to 98 percent by weight of the composition, said compound being selected from the group consisting of (A) substituted hippuric acid compounds having the formula

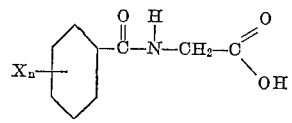

wherein X represents a member selected from the group consisting of chlorine and nitro radicals, and $n$ is an integer from 1 to 2, inclusive, and (B) the ammonium, alkali metal, lower alkylamine and alkanolamine salts thereof.

8. A method for modifying the growth characteristics of plants which comprises spraying the foliage of established plants with a growth modifying amount of a compound selected from the group consisting of (A) substituted hippuric acid compound of the formula

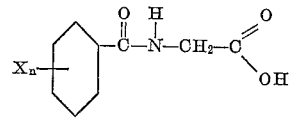

wherein X is selected from the group consisting of chlorine and nitro radicals, and $n$ is an integer from 1 to 2, inclusive, and (B) the ammonium, alkali metal, lower alkylamine and lower alkanolamine salts thereof.

9. The method of claim 1 wherein said compound is 2,4-dichlorohippuric acid.

10. The method of claim 1 wherein said compound is 4-chlorohippuric acid.

11. The method of claim 1 wherein said compound is 3,5-dinitrohippuric acid.

12. The method of claim 1 wherein said compound is m-nitrohippuric acid.

13. The method of claim 1 wherein said compound is a hippuric acid alkali metal salt.

14. The method of claim 1 wherein said compound is a hippuric acid ammonium salt.

15. The method of claim 1 wherein said compound is a hippuric acid alkanolamine salt.

16. The method of claim 1 wherein said compound is a hippuric acid alkylamine salt.

17. The method of claim 13 wherein said alkali metal is sodium.

18. The method of claim 13 wherein said alkali metal is potassium.

(References on following page)

References Cited in the file of this patent

UNITED STATES PATENTS

| | | |
|---|---|---|
| 2,287,102 | Isler | June 23, 1942 |
| 2,394,916 | Jones | Feb. 12, 1946 |

FOREIGN PATENTS

| | | |
|---|---|---|
| 511,665 | Great Britain | Aug. 22, 1939 |

OTHER REFERENCES

Molliard, in "Chemical Abstracts," vol. 6, column 1766, 1912.

Bokorny, in "Chemical Abstracts," vol. 17, column 299, 1923; and vol. 20, column 2182, 1926.

Frear: "Catalogue of Insecticides and Fungicides," vol. 1, 1947.

King: U.S. Dept. Agric. Handbook, No. 69, May 1954, page 191.